(12) United States Patent
Roskey

(10) Patent No.: US 6,437,457 B2
(45) Date of Patent: Aug. 20, 2002

(54) AIRFOIL VENTILATION SYSTEM FOR A BUILDING AND THE LIKE

(75) Inventor: John E. Roskey, Carson City, NV (US)

(73) Assignee: The Roskey Family Trust, Carson City, NV (US)

( * ) Notice: Subject to any disclaimer, the term of this patent is extended or adjusted under 35 U.S.C. 154(b) by 0 days.

(21) Appl. No.: 09/816,534

(22) Filed: Mar. 23, 2001

Related U.S. Application Data

(63) Continuation-in-part of application No. 09/290,526, filed on Apr. 12, 1999.

(51) Int. Cl.[7] .............................. F03D 9/00; H02P 9/04; E21F 3/00; F24F 13/20
(52) U.S. Cl. .......................... 290/55; 454/168; 454/367
(58) Field of Search ........................................... 290/55

(56) References Cited

U.S. PATENT DOCUMENTS

| | | | |
|---|---|---|---|
| 3,883,750 A | | 5/1975 | Uzzell, Jr. .................... 290/55 |
| 3,913,470 A | * | 10/1975 | Cullen ......................... 137/580 |
| 3,976,244 A | * | 8/1976 | Logsdon ...................... 236/49.5 |
| 4,002,023 A | | 1/1977 | Hartman ..................... 60/39.31 |
| 4,162,410 A | | 7/1979 | Amick ......................... 290/55 |
| 4,295,416 A | * | 10/1981 | Gorchev et al. ............. 181/224 |
| 4,315,415 A | * | 2/1982 | Wilson ..................... 137/527.8 |
| 4,504,192 A | | 3/1985 | Cyrus et al. ................... 416/41 |
| 4,508,973 A | | 4/1985 | Payne .......................... 290/55 |
| 4,546,264 A | | 10/1985 | Pinson ......................... 290/54 |
| 4,582,013 A | * | 4/1986 | Holland, Jr. ................ 114/39.3 |
| 4,642,958 A | | 2/1987 | Pewitt .......................... 52/302 |
| 4,781,523 A | | 11/1988 | Aylor .......................... 415/2 A |
| 4,801,811 A | * | 1/1989 | Assaf et al. .................. 290/55 |
| 4,909,135 A | * | 3/1990 | Greko ......................... 454/339 |
| 4,957,037 A | | 9/1990 | Tubbesing et al. .......... 98/42.21 |
| 5,155,992 A | * | 10/1992 | Follensbee et al. ....... 244/23 C |
| 5,195,251 A | * | 3/1993 | Gyurcsek et al. ............. 34/191 |
| 5,290,200 A | * | 3/1994 | Kiser .......................... 454/229 |
| 5,326,314 A | * | 7/1994 | Brockway et al. .......... 454/252 |
| 5,380,149 A | | 1/1995 | Valsamidis ................... 415/2.1 |
| 5,391,926 A | | 2/1995 | Staley et al. .................. 290/55 |
| 5,457,346 A | | 10/1995 | Blumberg et al. ............ 290/55 |
| 5,551,916 A | * | 9/1996 | Morse, Jr. ................... 454/340 |
| 5,655,964 A | | 8/1997 | Rheault et al. .............. 454/368 |
| 5,709,419 A | | 1/1998 | Roskey ........................ 290/55 |
| 5,711,480 A | | 1/1998 | Zepke et al. .................. 236/51 |
| 5,746,653 A | * | 5/1998 | Palmer et al. ............... 454/186 |
| 5,826,383 A | | 10/1998 | Garrison ...................... 52/198 |
| 5,860,858 A | * | 1/1999 | Wettergren .................... 34/235 |
| 6,149,516 A | * | 11/2000 | Mantyla ...................... 454/349 |
| 6,239,506 B1 | | 5/2001 | Roskey ........................ 290/55 |
| 6,319,115 B1 | * | 11/2001 | Shingaki ..................... 165/210 |

FOREIGN PATENT DOCUMENTS

| | | |
|---|---|---|
| DE | 4 002 341 | 8/1990 |
| FR | 450 138 | 3/1913 |
| FR | 1 195 450 | 11/1959 |
| FR | 2 379 709 | 10/1978 |

* cited by examiner

*Primary Examiner*—Nestor Ramirez
*Assistant Examiner*—Pedro J. Cuevas
(74) *Attorney, Agent, or Firm*—Burns, Doane, Swecker & Mathis, LLP

(57) ABSTRACT

A ventilation system for a building, or other structure includes a roof and an airfoil mounted on the roof. The airfoil includes a tubular member having a longitudinal axis, an inside, an outside, and an elongated opening extending parallel to the longitudinal axis. The air foil includes a leading edge positioned with respect to the longitudinal opening on the outside of the tubular member to create a pressure differential between the tubular member and the leading edge when wind blows past the airfoil. An air duct in communication with the interior of the tubular member extends into the building to enable the airfoil to draw air out from the building in response to the wind.

20 Claims, 9 Drawing Sheets

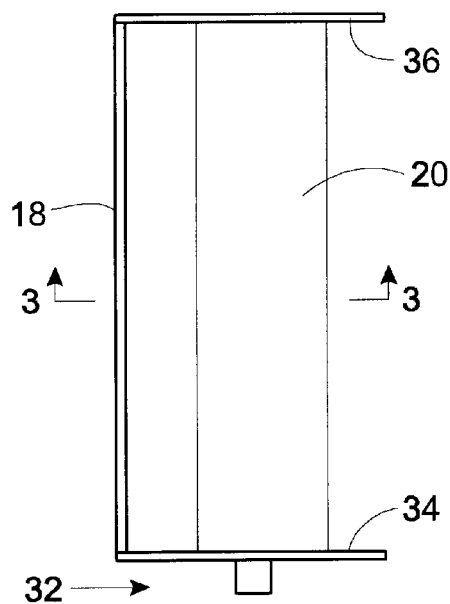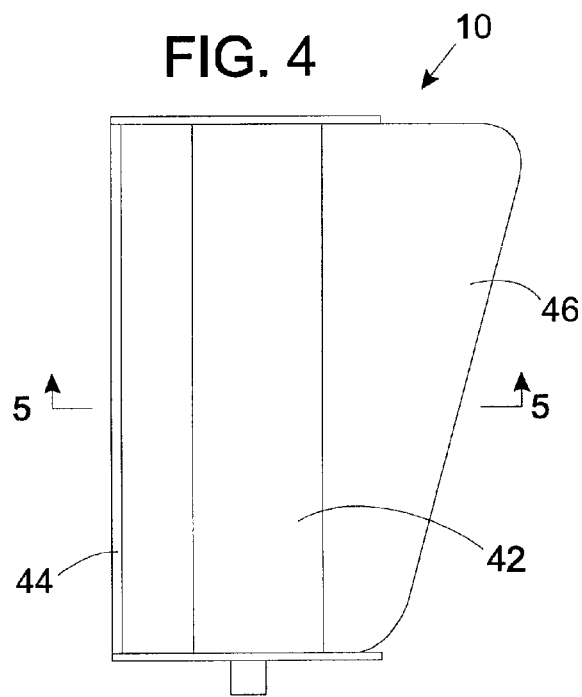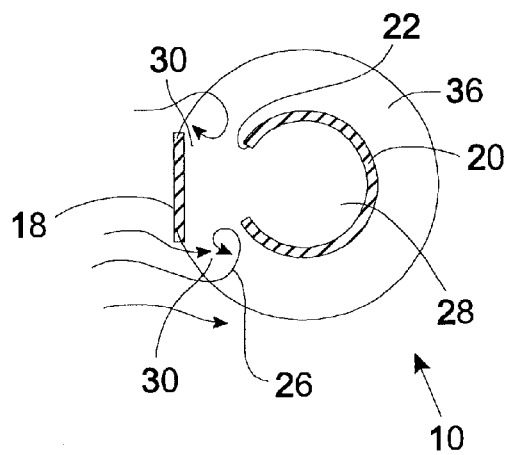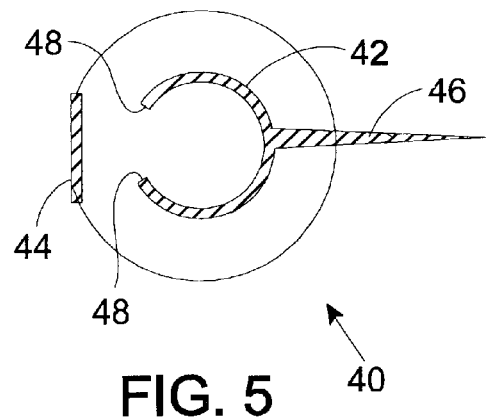

AIRFOIL VENTILATION SYSTEM FOR A BUILDING AND THE LIKE

CROSS-REFERENCE TO RELATED APPLICATION

This application is a continuation-in-part of U.S. patent application Ser. No. 09/290,526 filed on Apr. 12, 1999, the disclosure of which is incorporated herein by reference.

FIELD OF THE INVENTION

The invention relates to ventilation systems and to methods utilizing wind for ventilating enclosures.

BACKGROUND OF THE INVENTION

Ventilation systems circulate air through enclosures including buildings, vehicles and other enclosures. Active ventilation systems rely on imported power. Passive ventilation systems rely upon system design to circulate air.

Some active systems rely on powered fans, heaters, air conditioners and humidity modifiers connected through a series of ducts. This approach has been successful in controlling the internal environment of buildings, private residences and vehicles, but may be complicated and energy demanding.

Passive systems, including those that passively derive operating energy from the environment, are often inefficient or ill-suited for demanding applications. In buildings with a plurality of floors and a high-profile there are few, if any, passive systems that adequately circulate air throughout the building.

In open buildings such as barns, sheds and the like, some passive systems have proved useful. Roof mounted "squirrel cage" wind turbines, for instance, exhaust internal air from the building under influence of the wind. During the summer, exhausting air from the roof cools the building by providing an escape for hot air trapped beneath the roof. Exhausting the hot air also fosters an internal air flow and circulation which results in a more comfortable environment.

Squirrel cage turbines are limited in efficiency for several reasons. The turbines rest directly on the roof line, which restricts their access to the turbulent eddies of disturbed air adjacent to the roof itself. This is especially pronounced for roofs with little or no pitch. For roofs with greater pitch, the short profile of standard squirrel cage turbines ensures that at least some will be located in the wind shadow of the roof itself. In systems having multiples of these turbines, the wind may race past the pitched roof and occasionally induce a reverse flow in some of the turbines, negating the beneficial action of the other turbines, and dramatically reducing the overall system efficiency.

Poor operating efficiency associated with systems having a plurality of squirrel cage turbines on a peaked roof results in an increased number of turbines and duct holes required to achieve the minimum desired air flow. Additional holes in the roof are not desirable for roofs where rain is common. Holes may compromise the structural integrity of the roof. Further, holes reduce the ability of the roof to insulate the building from cold or heat.

U.S. Pat. No. 4,957,037 discloses a Roof Ridge Ventilator, the disclosure of this patent is incorporated herein by reference. This ventilator is designed to inhibit the entry of wind-driven water into the structure. Unfortunately, the volumetric air flow capability of this vent is limited.

U.S. Pat. No. 5,655,964, incorporated herein by reference, discloses a Static Roof Ventilator having triangular baffles. The baffles improve the chimney effect of the ventilator. Still, there are many high-profile buildings that require more airflow than the ventilator of the '964 patent can provide.

U.S. Pat. No. 5,711,480, incorporated herein by reference, discloses a control system for building ventilation. This control system relies on spread spectrum wireless communication between the components of the ventilation system in order to enable the system to operate efficiently without the need for complex, and expensive wiring.

What is desired is a ventilation system that is fuel efficient and can be used in buildings, or other enclosures, with high volumetric air flow needs.

SUMMARY OF THE INVENTION

A ventilation system for a building, or other structure includes a roof and an airfoil mounted on the roof. The airfoil includes a tubular member having a longitudinal axis, an inside, an outside, and an elongated opening extending parallel to the longitudinal axis. The air foil includes a leading edge positioned with respect to the longitudinal opening on the outside of the tubular member to create a pressure differential between the tubular member and the leading edge when wind blows past the airfoil. An air duct in communication with the interior of the tubular member extends into the building to enable the airfoil to draw air out from the building when the wind blows.

A control system including a valve is installed to modulate the air flow as desired for proper ventilation. Fully closing the valve protects against heat loss during cold weather. According to one aspect of the invention, the building includes an air conditioning system in communication with the control system. This valve can be either manually or automatically controlled and can be located within each individual airfoil's duct system or as part of a larger plenum served by a plurality of airfoils.

According to another aspect of the invention, the building includes a duct forming a central air column within the building. The duct is regulated by the control system to seal in case of fire.

BRIEF DESCRIPTION OF THE DRAWINGS

FIG. 2 is a side view of one of the airfoils of FIG. 1.

FIG. 3 is a cross sectional view of the airfoil of FIG. 2, taken along line 3—3.

FIG. 4 is a side view of an alternative embodiment of an airfoil according to the invention.

FIG. 5 is a cross sectional view of the airfoil of FIG. 4, taken along line 5—5.

DETAILED DESCRIPTION

Figure 1:
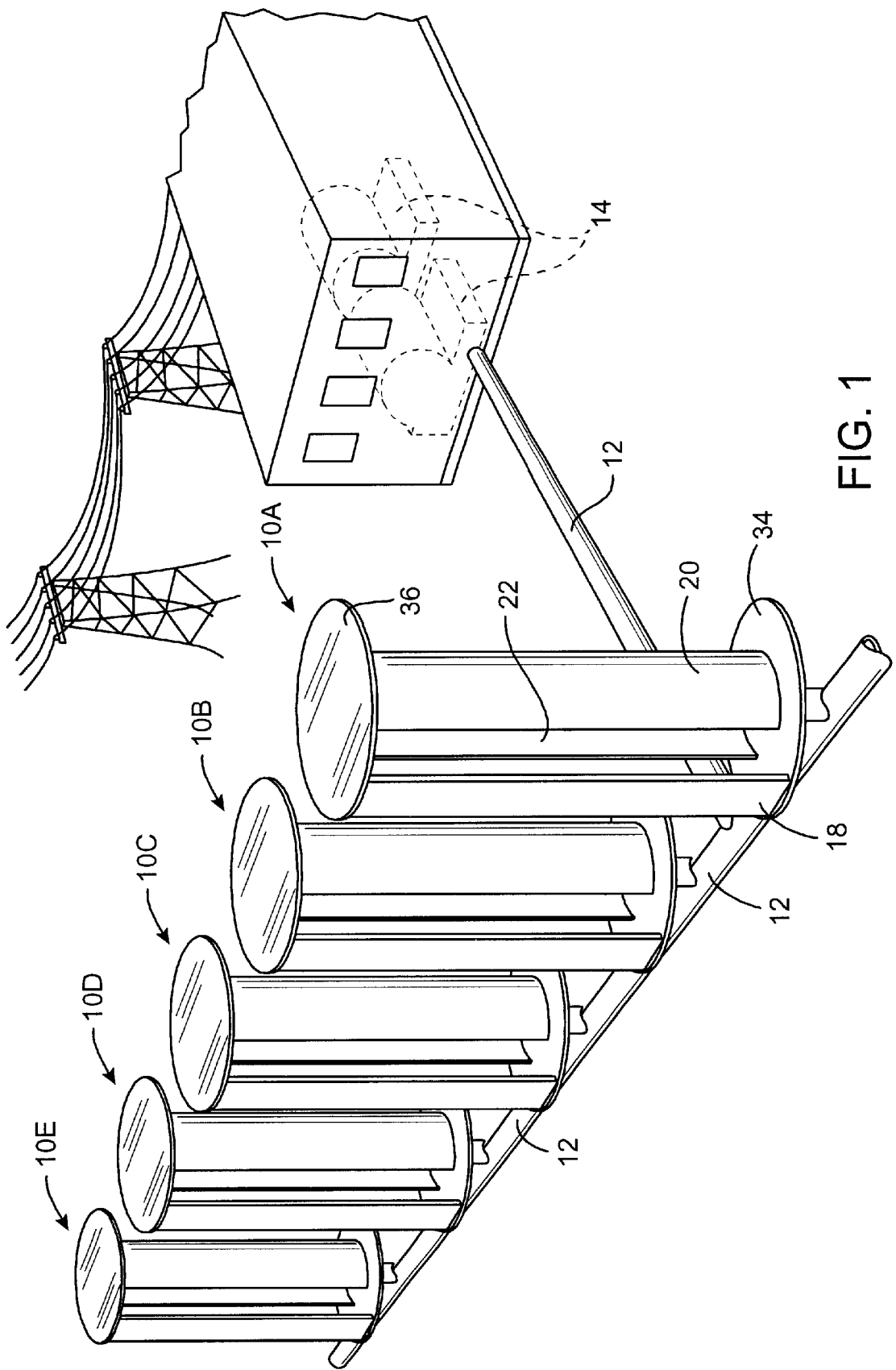
FIG. 1 is a perspective view of a wind energy collection system according to the present invention including a plurality of airfoils.

FIG. 1 shows a system for collecting energy from wind including one or an array of airfoils 10A–10E. The airfoils 10A–10E are passive, relying upon ambient wind to operate. Each airfoil has an inside and an outside. When wind blows past an airfoil, the inside of the airfoil is pressurized beyond the air pressure of the outside of the airfoil. This pressure difference causes air from within the airfoil to flow out of the airfoil.

The system includes air passageways 12 and a turbine 14. Air flowing out of the airfoil draws air via the air passageways 12 and the turbine 14, causing rotation of the turbine 14.

FIGS. 2 and 3 illustrate a first embodiment of an airfoil 10 including a substantially planar leading edge 18 and a cylindrical member 20. The cylindrical member 20, as illustrated in the cross sectional view of FIG. 3, has an opening 22 with a width of about 30° to about 80°, preferably about 60°. Positioned directly in front of the opening 22 in the cylindrical member 20 is the substantially planar leading edge 18. The leading edge 18 is preferably a plate shaped member having a height which is equal to a height of the cylindrical member 20 and a width which is equal to or slightly greater than the width of the opening 22.

It can be appreciated that the leading edge 18, according to an alternate embodiment, has a height which extends beyond the height of the cylindrical member 20.

The optimal width of the plate shaped member is preferably approximately 0.75 times the diameter of the cylindrical member 20. The planar leading edge 18 and the cylindrical member 20 together define two slots 30. The slots 30 are positioned on either side of the airfoil 10 at a point where the air passing from the interior 28 of the cylindrical member meets the adjacent airstream. The slots 30 begin at an edge of the leading edge 18 and terminate at a widest point of the cylindrical member 20.

The airfoil 10 is oriented so that the planar leading edge 18 is facing directly into the wind as shown in FIG. 3. As the wind contacts the planar leading edge 18, eddies 26 are created in and about the regions of the slots 30 between the leading edge 18 and the cylindrical member 20. Preferably, the distance between the leading edge 18 and the opening 22 is about 0.1 to about 0.7, more preferably about 0.25 to 0.5 times the diameter of the cylindrical member 20.

As the wind stream passes around the airfoil 10, the velocity of the air increases and the static pressure decreases in accordance with the Bernoulli principal. A region of low pressure is created behind the leading edge and extending to the greatest cross sectional width of the airfoil 10. The combination of the low pressure region and the eddies 26 created by the planar leading edge 18 draws the air out from an interior 28 of the cylindrical member 20.

The airfoil 10 is supported on a support structure 32 which provides communication of air flow between the interior 28 of the cylindrical member 20 and the air passageway 12 (FIG. 1). The support structure 32 preferably includes a rotation mechanism for allowing the airfoil 10 to rotate about the support. The rotatable support structure 32 may be any of those which are known to those in the art. The airfoil 10 includes a bottom skirt member 34 and a top skirt member 36 for improved efficiencies. The skirts 34, 36 support and connect the cylindrical member 20 and the planar leading edge 18. The skirts 34, 36 also function to prevent outside air below or above the airfoil 10 from disrupting the air flow over the airfoil. The skirts 34, 36 have a diameter which is greater than 1.5 times, preferably 2 or more times the diameter of the cylindrical member 20.

FIGS. 4 and 5 illustrate an embodiment of an airfoil 40 having a cylindrical member 42 and a planar leading edge 44. The airfoil 40 also includes a vane 46 which extends from the cylindrical member 42 opposite the opening 48 in the cylindrical member. The vane 46 acts to position the airfoil 40 with the planar leading edge 44 directly into the wind. As shown in the side view of FIG. 4, the vane 46 may taper from a largest width at the top of the airfoil 40 to a smallest width at the bottom of the airfoil. Although the vane 46 has been illustrated as extending along the entire length of the airfoil, a vane which extends along only a portion of the airfoil may also be used. The vane 46 may vary in shape as is known in the art. When an array of airfoils is used as illustrated in FIG. 1, a vane 46 may be provided on one or more than one of the airfoils for orienting the airfoils into the wind. If one vane 46 is used for rotation of a plurality of airfoils, the airfoils are interconnected by a mechanical positioning means which causes the airfoils to rotate simultaneously.

Figure 6:
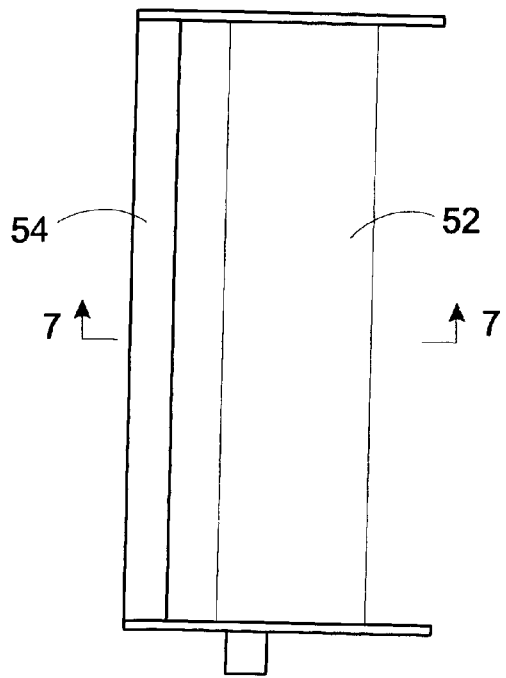
FIG. 6 is a side view of another embodiment of an airfoil according to the invention.
Figure 7:
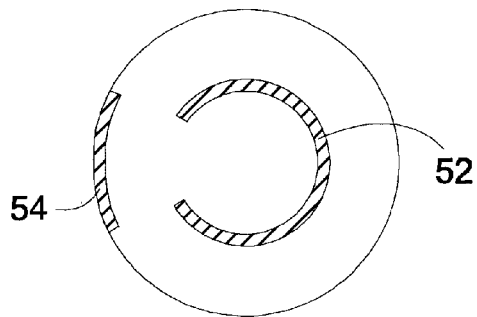
FIG. 7 is a cross sectional view of the airfoil of FIG. 6, taken along line 7—7.

FIGS. 6 and 7 illustrate a further embodiment of an airfoil 50 having a cylindrical member 52 and a leading edge 54. The substantially planar leading edge 54 is formed from a slightly curved plate in the embodiment of FIGS. 6 and 7. The curved surface of the substantially planar leading edge 54 reduces the efficiency of the wind collection system due to less change in static pressure caused by the leading edge. However, the embodiment of FIGS. 6 and 7 may provide an increased resistance to mechanical stress through an inherently stronger configuration and longer leading edge life due to slightly lower forces created by the wind on the leading edge 54.

Figure 8:
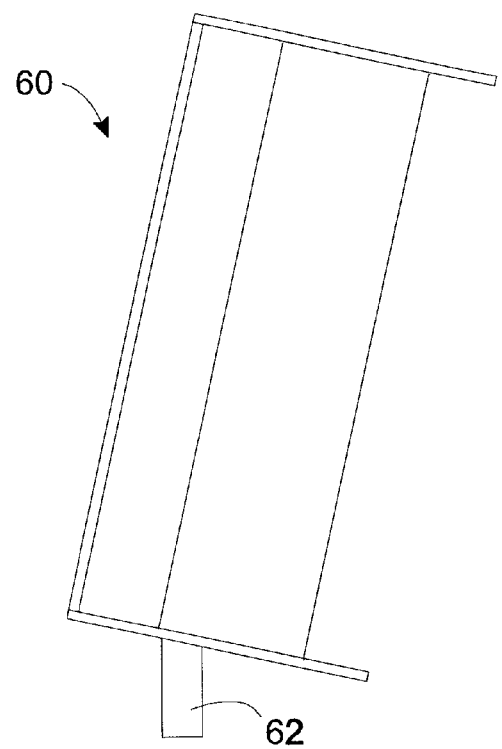
FIG. 8 is a side view of the airfoil of FIG. 2 mounted at an angle.

FIG. 8 illustrates a further alternative embodiment of an airfoil 60 having a construction similar to that of the embodiment of FIGS. 2 and 3 which is mounted at an angle. The mounting of the airfoil 60 on a support 62 such that the airfoil is canted backward out of the wind on the support provides for positioning of the airfoil in the wind stream. Preferably, the airfoil 60 has a vertical axis which is canted from about 1° to about 60° with respect to the vertical axis of the support 62. Preferably the cant is about 33°.

The airfoils according to the present invention may be positioned on the corresponding support structures such that the support structure is approximately centered beneath an axis of the cylindrical member. Alternatively, the support structure may be positioned off center towards the leading edge (with the aerodynamic center of pressure aft of the pivot point) to allow the airfoil to be self positioning in the wind. The orientation of the airfoils into the wind may also be accomplished by mechanical means.

Figure 9:
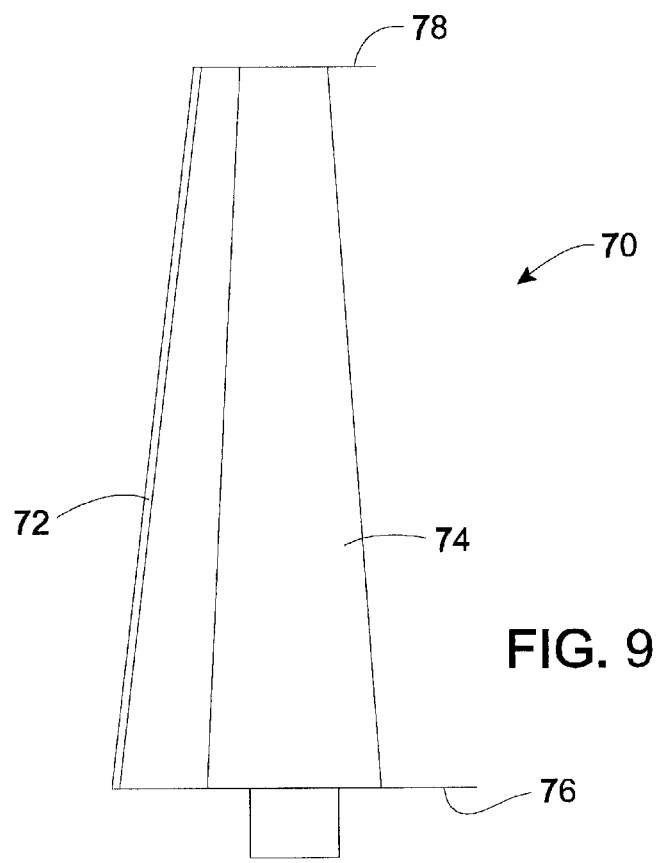
FIG. 9 is a side view of an alternative embodiment of an airfoil having a tapered shape.

FIG. 9 illustrates an alternative embodiment of an airfoil 70 formed from a substantially planar leading edge 72 and a conical member 74. The conical member 74 is circular in cross section and operates in the same manner as the cylindrical member 20 discussed above with respect to the embodiment of FIGS. 2 and 3. The tapered airfoil 70 of FIG. 9 has been found to achieve the same level of draw, or rate of air discharge as provided by a similarly sized airfoil having a cylindrical element. Furthermore, the tapered airfoil 70 achieves the same rate of air discharge with less material, and hence lower cost. Preferably, a cross section through the airfoil 70 has the same preferred dimensions as the embodiment shown in FIG. 3. In addition, a diameter of the conical member 74 at an upper end is preferably about ½ a diameter of the conical member at the base. The airfoil 70 is also preferably provided with a bottom skirt 76 and a top skirt 78 having relative proportions similar to those described above with respect to the embodiment of FIGS. 2 and 3.

Figure 10:
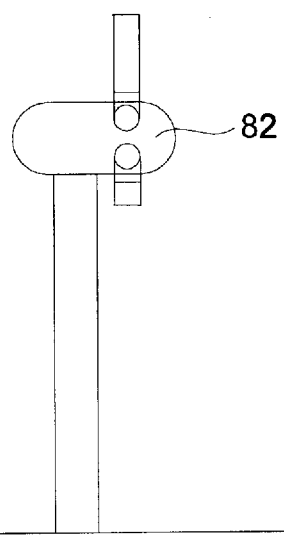
FIG. 10 is a side view of an array of airfoils arranged radially around a hub.
Figure 11:
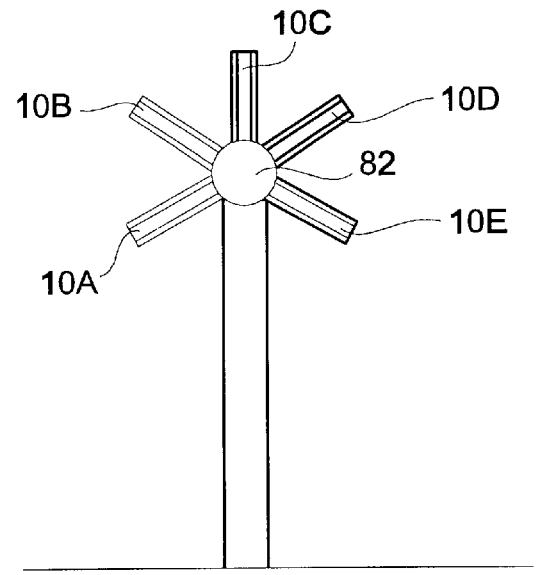
FIG. 11 is a front view of the array of airfoils of FIG. 10.

FIGS. 10 and 11 illustrate a radially arranged array of airfoils 10A–10E which are fixed on a hub 82. The radial arrangement of the airfoils provides an appearance similar to current open air turbine without the external moving parts.

When the airfoils 10 according to the present invention are arranged in an array as illustrated in FIG. 1 or FIG. 10, each airfoil enhances the ambient wind pattern for the adjacent airfoils by forming a series of narrow throats between the airfoils which lead to an increase in the air velocity and a corresponding decrease in static pressure between the airfoils. Thus, the use of the multiple airfoils 10A–10E arranged in an array will magnify the wind collection capabilities of the system. When the airfoils 10A–10E are arranged in a line, the space between adjacent airfoils is approximately 1 to approximately 3 times, preferably approximately 2 times the diameter of the cylindrical member 20 to optimize the efficiency of the system.

The height of the airfoils 10 according to the present invention is preferably about 3 to about 7 times the diameter of the cylindrical member. More preferably, the airfoil has a height of about 6 times the diameter of the cylinder member.

Although the invention has been illustrated with the airfoils positioned vertically, the airfoils may also be positioned horizontally or at any other angle with respect to the ground.

As described in U.S. Pat. No. 5,709,419, the disclosure of which is incorporated herein by reference, additional smaller secondary airfoils or concentrator wings may be provided to increase the velocity of the air flow over the airfoils. In addition, the turbines 14 may be provided with filters or screens in the air inlet areas through which air is drawn into the turbine to control the cleanliness of the air drawn though the system.

Figure 12:
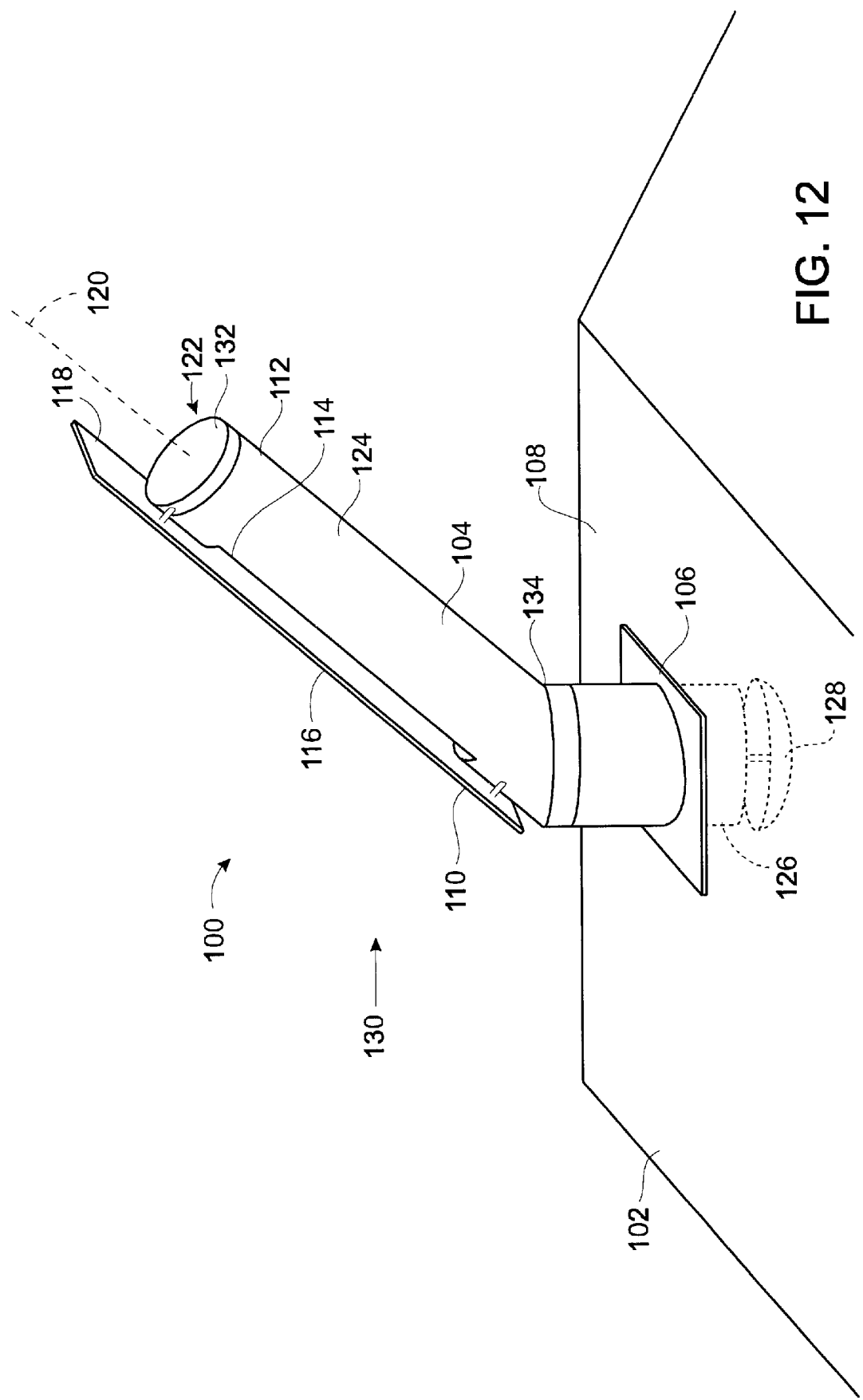
FIG. 12 is a perspective view of a airfoil ventilation system mounted on the roof of a building.

FIG. 12 shows a ventilation system, generally designated with the reference numeral 100. The system 100 includes a building 102, an airfoil 104 and a support structure 106. The system 100 is passive, relying on the wind to pump air from within the building 102.

The building 102 has a roof 108. The roof 108 is peaked and the support structure 106 mounts the air foil 104 on one side of the peak.

The airfoil 104 includes a leading edge 110 and a tubular member 112. The leading edge includes a windward side 116 and a leeward side 118. The tubular member 112 includes an opening 114 defined adjacent the leeward side 118 of the leading edge 110. Accordingly when wind blows past the airfoil 104 towards the windward side 116 of the leading edge 110, the wind creates a pressure differential between the windward side 116 and the leeward side 118 of the leading edge 110. This pressure differential draws air out from the tubular member 112 via the opening 114.

The tubular member 112 has a longitudinal axis 120, defines an inside 122, an outside 124. The opening 114 is elongated, extending parallel to the longitudinal axis 120. The leading edge 110 is positioned with respect to the longitudinal opening 114 on the outside 124 of the tubular member 112. Positioning the leading edge 110 with respect to the opening 114 creates a pressure differential between the inside 122 of the tubular member 112 and the windward side 116 of the leading edge 110 when wind blows past the airfoil 104.

The system 100 includes an air duct 126 in communication with the inside 122 of the tubular member 112, and extending into the building 102 to enable the airfoil 104 to draw air out from the building 102. The air duct 126 has a cover 128 that protects the air duct 126 and the airfoil 104 from debris and functions to ensure a distributed, or even, flow of air from within the ventilated enclosure.

The support structure 106 rotatably supports the airfoil 104 and orients the airfoil 104 so that the leading edge 110 is faces into the wind. The airfoil 104 is canted with respect to the wind direction 130 so that the airfoil 104 functions as a wind vane to automatically direct the leading edge 110 into the wind and so that the airfoil 104 operates efficiently.

The tubular member 112 has a top 132 and a bottom 134. The leading edge 110 extends from near the bottom 134 to beyond the top 132 of the tubular member 112.

Figure 13:
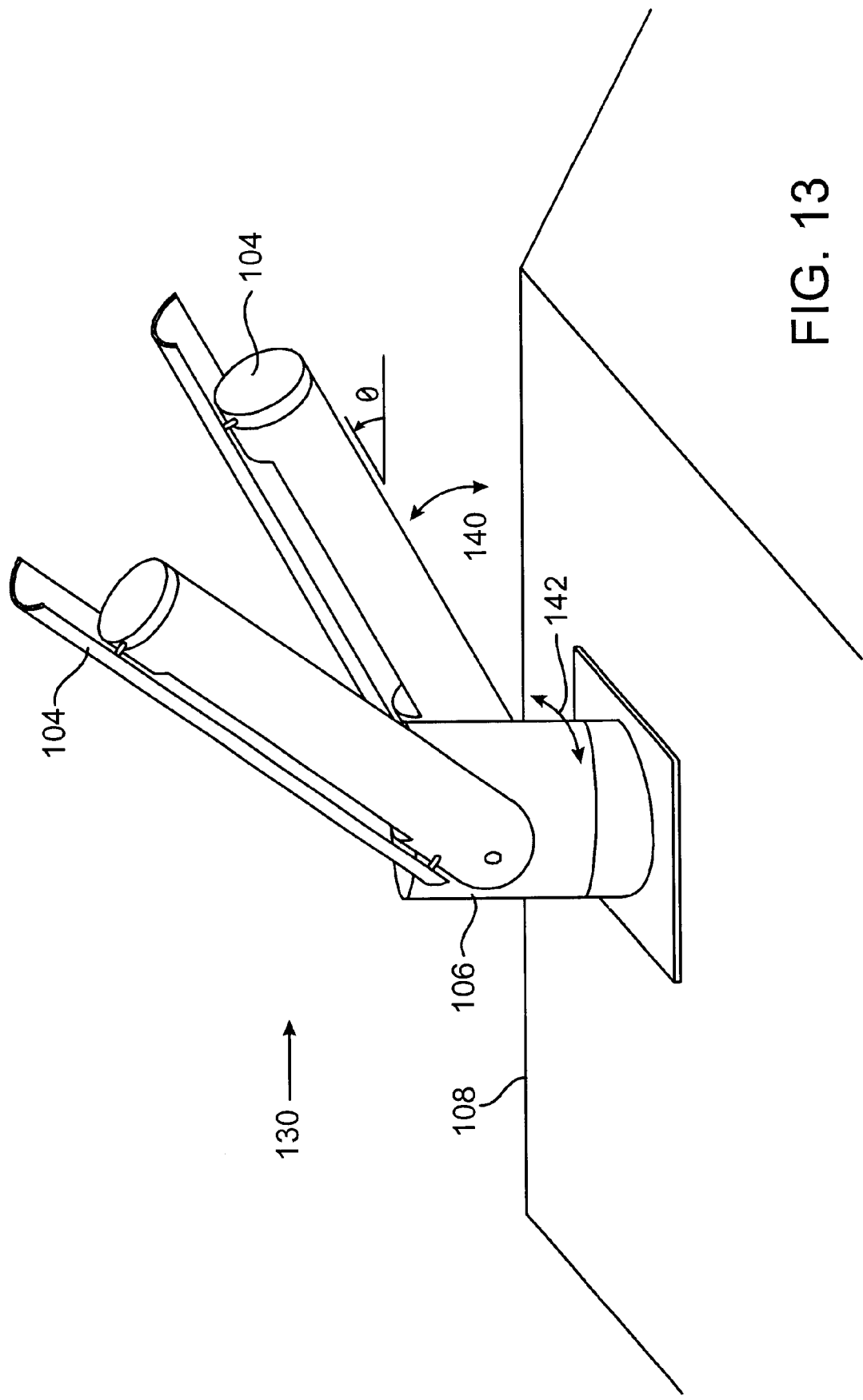
FIG. 13 is a perspective view of an airfoil ventilation system having a pair of airfoils mounted on a common support.

FIG. 13 shows two airfoils 104 mounted on a single support structure 106. The support structure 106 attaches to the roof 108 and functions as a turret. The support structure 106 rotates and adjusts the angle of cant of the airfoils 104. The angle of cant is represented by the angle $\Theta$ with respect to the wind direction 130. Accordingly, the airfoil 104 rotates in the directions of the arrows 140 to adjustably cant the airfoil 104. The support structure 106 rotates the airfoils 104 to face the wind direction 130 by rotating in the direction of the arrows 142.

Figure 14:
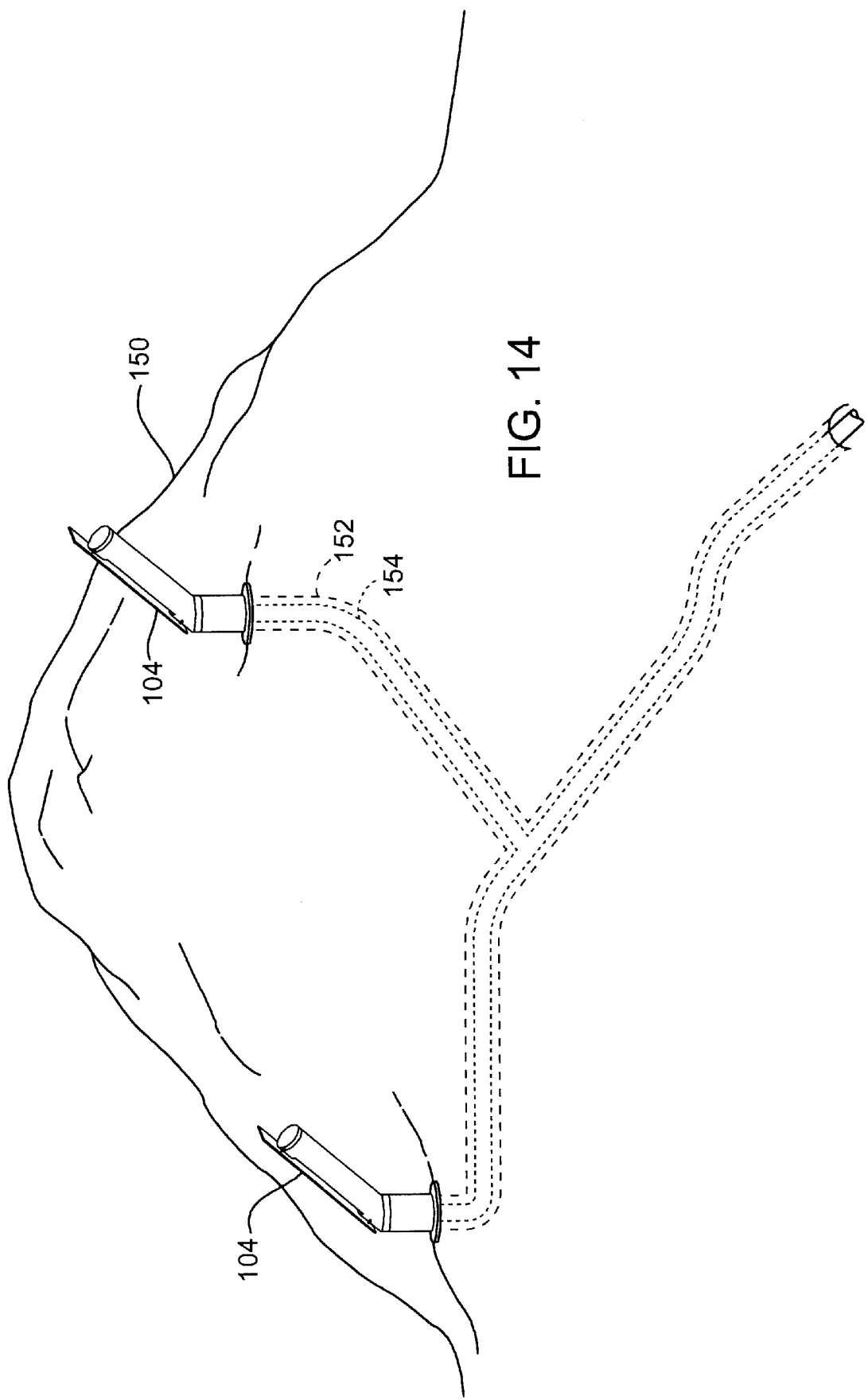
FIG. 14 is a perspective view of a ventilation system for a mine in accordance with the present invention.

FIG. 14 shows a mountain 150 including a mine shaft 152. The mine shaft 152 has a system of air ducts, some of which are filtered intake ducts, and others are exhaust ducts. The mine shaft 152 includes a vent 154 and the system 100. The system 100 includes airfoils 104 attached in fluid communication with the vent 154 of the mine shaft 152.

Figure 15:
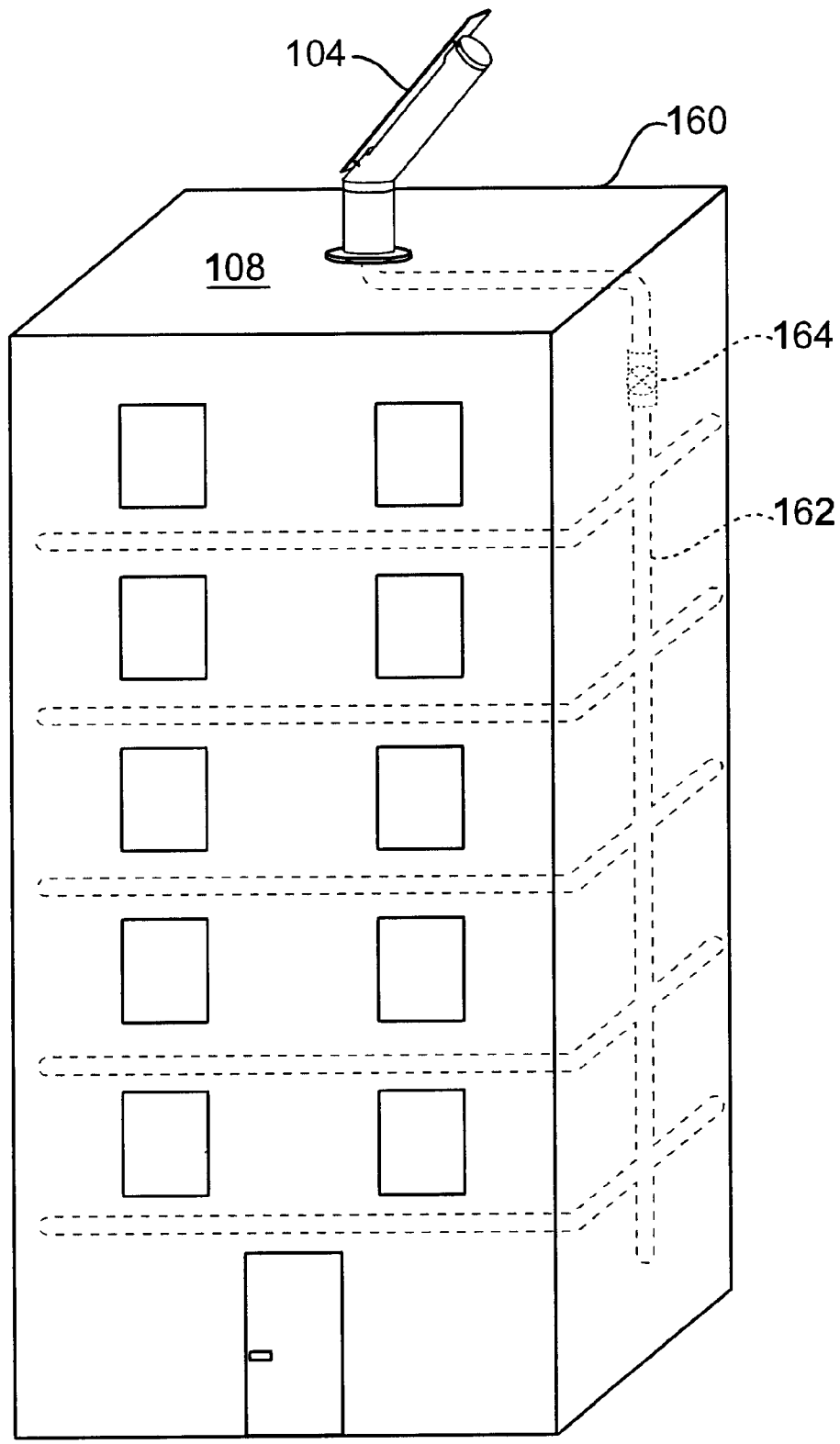
FIG. 15 is a perspective view of a ventilation system for a high-profile building.

FIG. 15 shows a building 160 having a plurality of floors, and consequently, a high aspect ratio. The airfoil 104 mounts on the roof 108 of the building 160. The building includes an air duct 162 in communication with the airfoil 104 and each floor of the inside of the building. The duct 162 includes a valve 164 for regulating airflow within the duct 162. Preferably, the duct 162 includes a intake with an air filter, or air conditioner.

Although the airfoil 104 mounts on the roof of the building 160, it can be appreciated that the building 160 may have a wall mounted airfoil, or an airfoil 104 can be mounted in the building 160, at an interior section that is exposed to wind.

Figure 16:
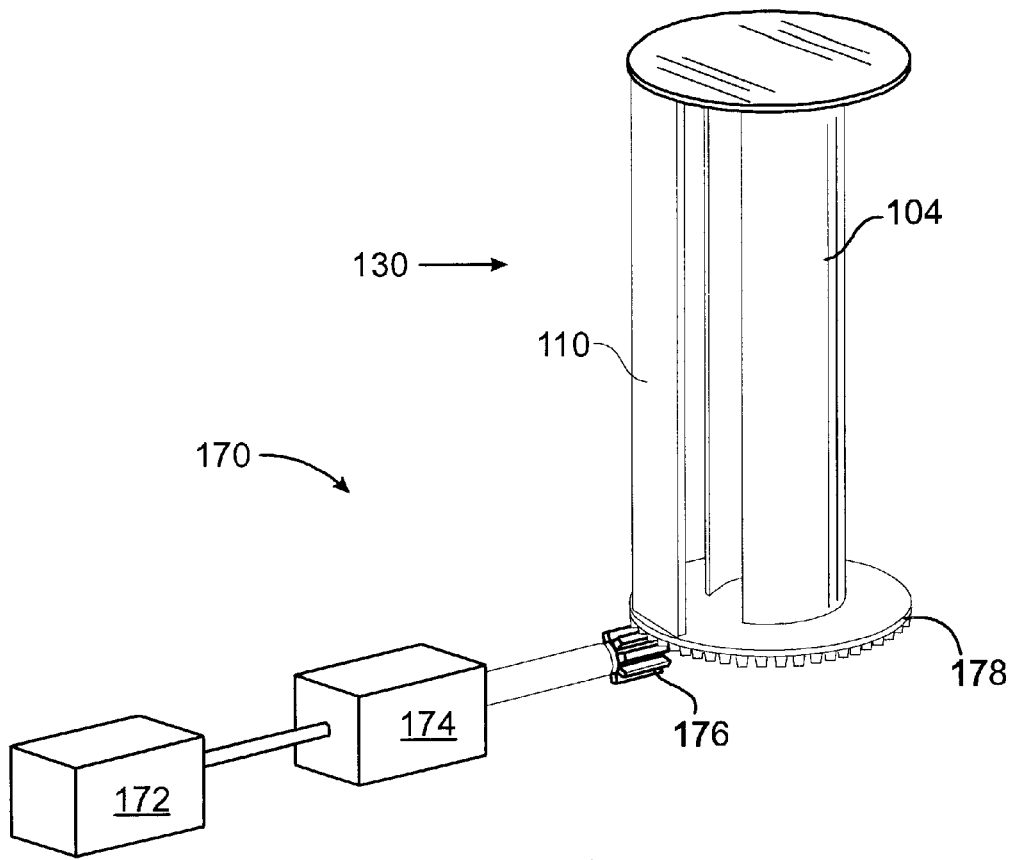
FIG. 16 is an automated system for orienting an air foil with respect to the wind.

FIG. 16 shows a sensor system, generally designated with the reference numeral 170. The system 170 includes a wind sensor 172, a motor 174, a gear assembly 176 and a geared support structure 178. The airfoil 104 mounts on the geared support structure 178.

The sensor 172 senses wind direction and communicates electronically with the motor 174. The motor 174 selectively rotates the gear assembly 176, which rotates the support structure 178. The motor 174 operates in response to the sensor 172 to direct the leading edge of the airfoil 104 into the direction of the wind 130.

Figure 17:
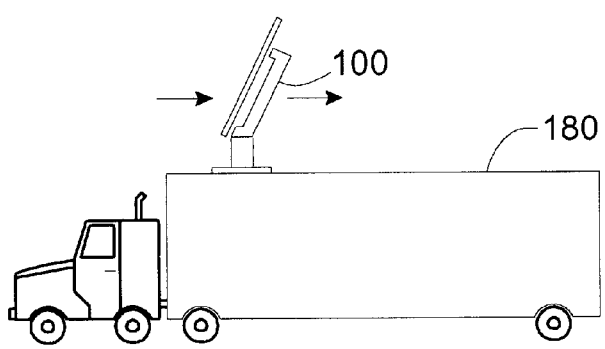
FIG. 17 is the airfoil ventilation system on a motor vehicle.

FIG. 17 shows the system 100 on a motor vehicle 180 to ventilate the motor vehicle. While the system 100 is shown mounted on the top of the vehicle 180, it can be appreciated that normal driving speeds enable the size of the system 100 to be greatly reduced.

One embodiment of the vehicle mounted system 100 includes shrouding one or more systems 100 within an air vent system to regulate air flow within an automobile. An air vent scoop, for example, would shroud the system 100. This is beneficial, as compared to using fans, to reduce noise and to provide improved economy for a passenger compartment ventilation system.

The system 100 can also be used to improve engine performance by pressurizing engine air intake, or drawing air out the exhaust.

According to another embodiment, the system 100 mounts on an aircraft for improving air circulation within the cabin and cargo compartment. The system 100 would also be useful for circulating air through non-pressurized compartments.

Figure 18:
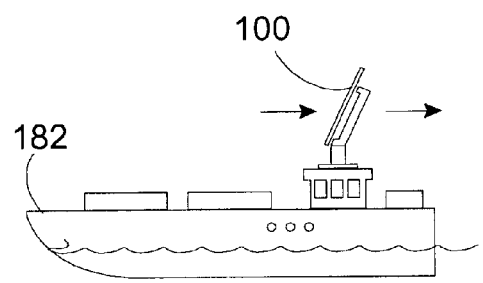
FIG. 18 is the airfoil ventilation system on a boat.

FIG. 18 shows the system 100 on a boat 182 to ventilate the boat 182. The system 100 vents cargo holds, crew compartments and engine compartments. According to one aspect of the invention, the system vents the boat fuel system to allow undesirable fuel vapors to escape.

Although the invention has been illustrated with respect to a wind powered system, it can be appreciated that the present system can be supplemented with an electrical power, air conditioning, heating and humidity control. Further, it can be appreciated that the present invention can be used to supplement any existing system. Still further, the present invention can include a wireless, or wire based, control system for efficiently controlling the flow of air within a building, or other structure. While the invention has been described in detail with reference to the preferred embodiments thereof, it will be apparent to one skilled in the art that various changes and modifications can be made and equivalents employed, without departing from the present invention. Accordingly, the invention is to be limited only by the claims below.

I claim:

1. A ventilation system for a building, comprising:
   a building having a roof;
   an airfoil mounted on the roof, the airfoil includes a tubular member having a longitudinal axis, the tubular member defining an inside, an outside, and an elongated opening extending parallel to the longitudinal axis, the air foil includes a leading edge positioned with respect to the longitudinal opening on the outside of the tubular member to create a pressure differential between the tubular member and the leading edge when wind blows past the airfoil; and
   an air duct in communication with the interior of the tubular member, and extending into the building to enable the airfoil to draw air out from the building.

2. A system as set forth in claim 1, further comprising a support structure for rotatably supporting the airfoil, the support structure orienting the airfoil so that the leading edge is faces into the wind.

3. A system as set forth in claim 2, further comprising a vane connected to the airfoil for rotating the airfoil on the support structure to orient the airfoil so that the leading edge faces into the wind.

4. A system as set forth in claim 2, wherein the support structure cants the airfoil with respect to the wind.

5. A system as set forth in claim 2, wherein the tubular member has a top and a bottom, the airfoil includes top and bottom skirts positioned at a top and a bottom of the tubular member.

6. A system as set forth in claim 2, wherein the tubular member has a top, the leading edge extends beyond the top of the tubular member.

7. A system as set forth in claim 2, further comprising a wind direction sensor and a motor, the motor rotates the airfoil in response to the wind direction sensor.

8. A system as set forth in claim 2, wherein the tubular member is cylindrical.

9. A system as set forth in claim 2, wherein the tubular member is conical.

10. A ventilation system for a building comprising:
    a building with a roof;
    an airfoil having a leading edge, the air foil defining an elongated opening extending parallel to the leading edge, the elongated opening being spaced from the leading edge;
    the air foil defines an air passageway and an air duct in communication with the elongated opening to deliver air between the airfoil and a turbine system; and
    a support structure for rotatably supporting the airfoil on the roof, the support structure orienting the airfoil so that the leading edge faces into the wind.

11. The system of claim 10, wherein the airfoil includes a cylindrical member, the cylindrical member defines the elongated opening, the cylindrical member being canted with respect to the wind.

12. The system of claim 11, wherein the airfoil rotates to adjustably position the leading edge towards the wind.

13. The system of claim 12, wherein the leading edge and the cylindrical member parallel each other.

14. A ventilation system for a mine shaft comprising:
    a mineshaft with a vent;
    an airfoil having a leading edge, the air foil defining an elongated opening extending parallel to the leading edge, the elongated opening being spaced from the leading edge;
    the leading edge being canted with respect to the wind,
    the airfoil defines an air passageway and an air duct in communication with the elongated opening to deliver air between the airfoil and the mineshaft vent; and
    a support structure for rotatably supporting the airfoil, the support structure orienting the airfoil so that the leading edge faces into the wind.

15. The system of claim 14, wherein the airfoil includes a cylindrical member, the cylindrical member defines the elongated opening.

16. The system of claim 15, wherein the cylindrical member is canted at least 1 degree with respect to the wind.

17. The system of claim 16, wherein the leading edge and the cylindrical member are canted in parallel with each other.

18. A wind-driven ventilation system for a mine shaft, comprising:

a mine shaft having a vent;

an airfoil including a tubular member having a longitudinal axis, the tubular member defining an inside, an outside, and an elongated opening extending parallel to the longitudinal axis, the air foil includes a leading edge positioned with respect to the longitudinal opening on the outside of the tubular member to create a pressure differential between the tubular member and the leading edge when wind blows past the airfoil; and an air duct in communication with the vent and with the interior of the tubular member draw air out from the mine shaft.

19. The system of claim 18, wherein the airfoil includes a cylindrical member, the cylindrical member defines the elongated opening.

20. The system of claim 19, wherein the cylindrical member is canted at about 33 degrees with respect to the wind.

* * * * *